(12) United States Patent
Smrha et al.

(10) Patent No.: US 8,070,112 B2
(45) Date of Patent: Dec. 6, 2011

(54) LATERAL STORAGE SPOOL FOR OVERHEAD CABLE PATHWAY

(75) Inventors: Mark Smrha, Burnsville, MN (US); Hutch Coburn, Eden Prairie, MN (US); Chad J. Sjodin, Savage, MN (US); John Schmidt, Minneapolis, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 376 days.

(21) Appl. No.: 12/009,138

(22) Filed: Jan. 15, 2008

(65) Prior Publication Data

US 2008/0203240 A1 Aug. 28, 2008

Related U.S. Application Data

(60) Provisional application No. 60/881,414, filed on Jan. 19, 2007.

(51) Int. Cl.
| | |
|---|---|
| *E21F 17/02* | (2006.01) |
| *F16L 3/00* | (2006.01) |
| *A62C 13/76* | (2006.01) |
| *A62C 37/50* | (2006.01) |
| *B05B 15/06* | (2006.01) |
| *A47G 29/00* | (2006.01) |
| *G02B 6/00* | (2006.01) |

(52) U.S. Cl. ............... 248/61; 248/79; 248/82; 248/81; 248/89; 248/92; 385/135; 385/136; 385/137

(58) Field of Classification Search .................. 248/61, 248/79, 81–82, 89, 92; 385/134, 135, 136, 385/137, 60, 66, 69; 174/101
See application file for complete search history.

(56) References Cited

U.S. PATENT DOCUMENTS

| | | | |
|---|---|---|---|
| 4,792,203 A | 12/1988 | Nelson et al. | |
| 5,399,814 A | 3/1995 | Staber et al. | |
| 5,530,787 A * | 6/1996 | Arnett | 385/137 |
| 5,802,237 A * | 9/1998 | Pulido | 385/135 |
| 5,872,336 A | 2/1999 | Long | |
| 5,923,753 A * | 7/1999 | Haataja et al. | 379/438 |
| 5,937,131 A * | 8/1999 | Haataja et al. | 385/136 |
| 6,250,816 B1 | 6/2001 | Johnston et al. | |
| 6,356,697 B1 | 3/2002 | Braga et al. | |
| 6,591,051 B2 | 7/2003 | Solheid et al. | |
| 6,625,374 B2 * | 9/2003 | Holman et al. | 385/135 |
| 6,633,718 B1 * | 10/2003 | Thom | 385/136 |
| RE38,311 E | 11/2003 | Wheeler | |

(Continued)

FOREIGN PATENT DOCUMENTS

DE  37 42 448 A1  6/1989

(Continued)

OTHER PUBLICATIONS

Richco® *Fiber Management*, 1 pg., (Date: Publicly known prior to the filing date of the present application).

*Primary Examiner* — Terrell McKinnon
*Assistant Examiner* — Christopher Garft
(74) *Attorney, Agent, or Firm* — Merchant & Gould P.C.

(57) ABSTRACT

A system including an overhead cable pathway structure and a cable storage device that mounts overhead to the cable pathway structure. The cable storage device including a storage spool and a cable pathway exit having a curved surface that guides excess cable exiting from the overhead cable pathway structure to the spool.

9 Claims, 4 Drawing Sheets

U.S. PATENT DOCUMENTS

| | | | |
|---|---|---|---|
| 6,756,539 B1 | 6/2004 | VanderVelde | |
| 6,863,446 B2 | 3/2005 | Ngo | |
| 6,988,716 B2 | 1/2006 | Hoffend, Jr. | |
| 7,295,747 B2 | 11/2007 | Solheid et al. | |
| 7,330,625 B2 | 2/2008 | Barth | |
| 7,408,769 B2 | 8/2008 | Mertesdorf et al. | |
| 7,463,812 B2 | 12/2008 | Coburn et al. | |
| 7,493,002 B2 | 2/2009 | Coburn et al. | |
| 7,493,006 B2 * | 2/2009 | Welnert et al. | 385/137 |
| 7,583,885 B2 | 9/2009 | Kowalczyk et al. | |
| 7,668,433 B2 * | 2/2010 | Bayazit et al. | 385/135 |
| 7,899,299 B2 | 3/2011 | Coburn et al. | |
| 2004/0086232 A1 | 5/2004 | Fujiwara et al. | |
| 2004/0086252 A1 | 5/2004 | Smith et al. | |
| 2004/0228599 A1 | 11/2004 | Haataja et al. | |
| 2006/0137900 A1 | 6/2006 | Weinert et al. | |
| 2006/0278426 A1 | 12/2006 | Barth | |
| 2008/0023212 A1 * | 1/2008 | Larsen et al. | 174/101 |
| 2008/0124038 A1 | 5/2008 | Kowalczyk et al. | |
| 2008/0175554 A1 | 7/2008 | Coburn et al. | |
| 2009/0067803 A1 | 3/2009 | Cobum et al. | |
| 2009/0129045 A1 | 5/2009 | Mertesdorf et al. | |
| 2009/0257726 A1 | 10/2009 | Redmann et al. | |
| 2009/0317046 A1 * | 12/2009 | Marcouiller et al. | 385/135 |
| 2011/0116758 A1 | 5/2011 | Coburn et al. | |

FOREIGN PATENT DOCUMENTS

| | | |
|---|---|---|
| DE | 94 18 155 U1 | 2/1995 |
| NL | 7115361 | 5/1973 |
| WO | WO 94/14253 | 6/1994 |

* cited by examiner

LATERAL STORAGE SPOOL FOR OVERHEAD CABLE PATHWAY

CROSS-REFERENCE TO RELATED APPLICATIONS

This application claims the benefit of U.S. Provisional Application Ser. No. 60/881,414, filed Jan. 19, 2007; which application is incorporated herein by reference.

FIELD OF THE INVENTION

This disclosure relates to methods and devices for use in the telecommunications industry. More specifically, this disclosure relates to methods and devices for use in managing and organizing telecommunications cables.

BACKGROUND OF THE INVENTION

In the telecommunications industry, effective management and organization of cables is necessary in light of the massive cabling schematics involved in providing telecommunication services. Telecommunication facilities, such as data centers or central offices, for example, often have rows of equipment racks and/or equipment cabinets interconnected to cables routed overhead. The cabling schematics of such facilities involve dropping cables down from overhead cable pathways (e.g., troughs or ladders), terminating the cables to termination panels mounted on the racks or in the cabinets, and storing excess cable slack about cable management devices (e.g., spools) mounted to the racks or cabinets.

Space to accommodate the increasing demand for telecommunication services is limited. Improvements are needed in the methods and devices for managing and organizing the systems, cabling schematics, and components associated with providing telecommunication services.

SUMMARY OF THE INVENTION

The present disclosure relates to an overhead cable management system including a cable storage device that mounts to an overhead cable pathway structure. The overhead arrangement of the cable storage device allots more space in telecommunications facilities for equipment racks, equipment cabinets, and telecommunication equipment.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
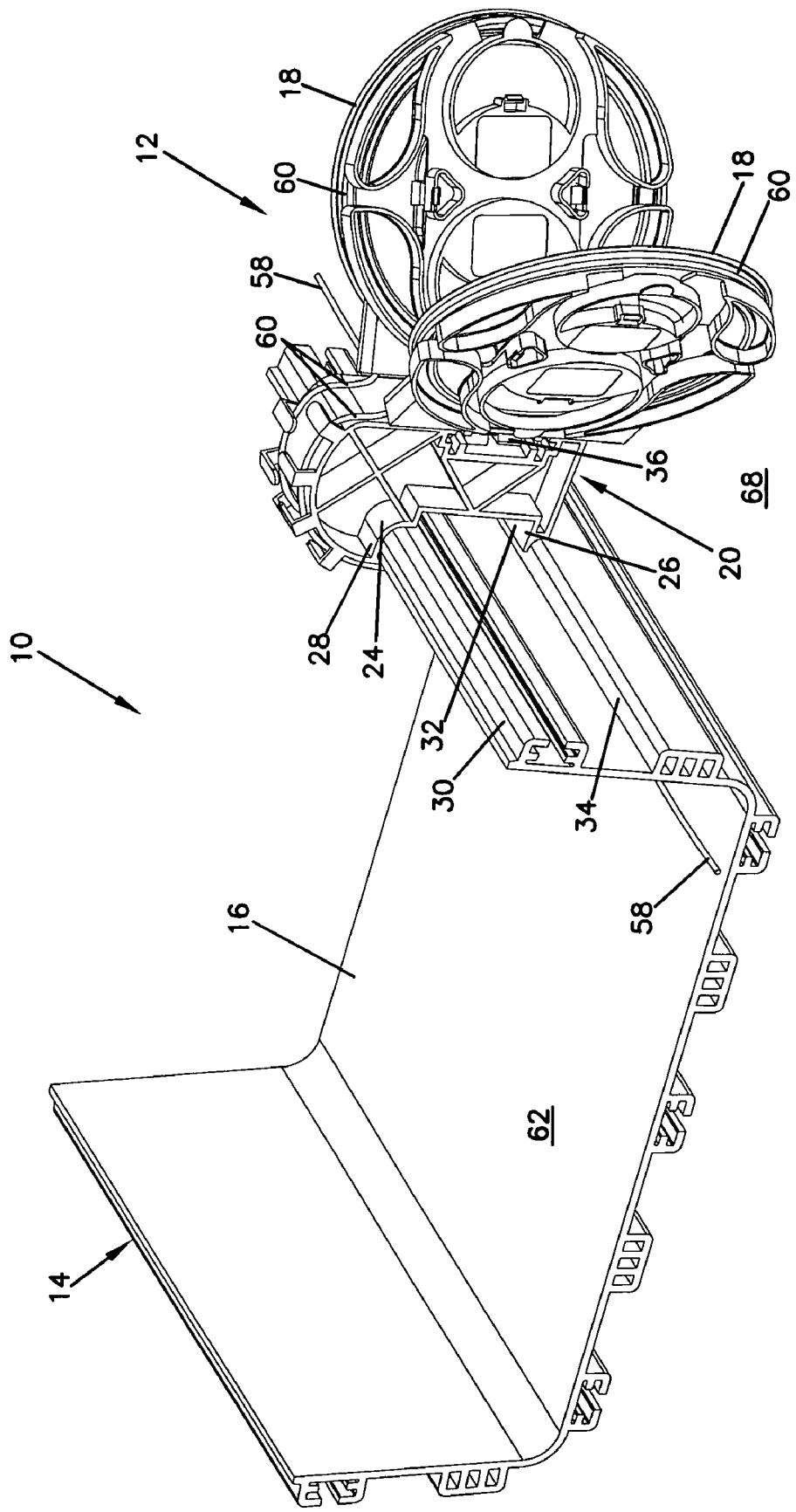
FIG. 1 is a top perspective view of one embodiment of a cable storage device mounted to an overhead cable pathway structure, in accordance with the principles disclosed.

FIG. 1 illustrates one embodiment of an overhead cable management system 10 in accordance with the principles disclosed. The overhead cable management system 10 is designed to manage and organize cables and related components to increase capacity in limited telecommunication facility space. The overhead cable management system 10 of the present disclosure generally includes a cable storage device 12 that mounts to an overhead cable pathway structure 14.

Figure 2:
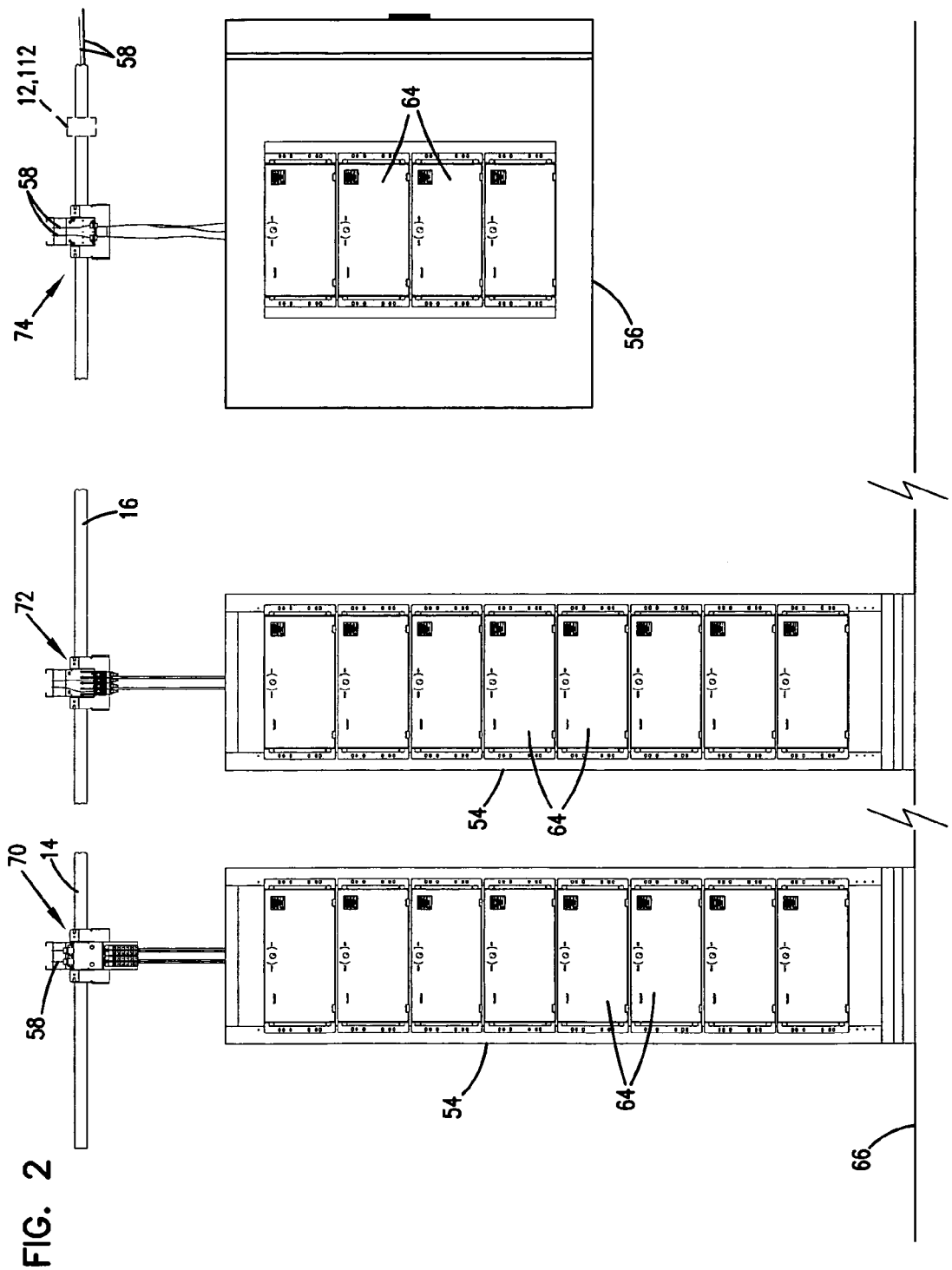
FIG. 2 is a front view of a telecommunications system, including the cable storage device of FIG. 1 (schematically represented), in accordance with the principles disclosed.

Referring to FIG. 2, in telecommunication facilities, such as data centers or central offices, for example, overhead cable pathway structures 14 are hung above racks (e.g. 54), cabinets (e.g., 56), and/or other equipment enclosures or framework. The overhead cable pathway structures 14 carry cables 58 that interconnect to equipment 64 mounted on the racks 54, for example. For purposes of simplification, the remaining description refers to the structure to which the equipment 64 mounts as a "rack;" however, it is to be understood that the present disclose applies similarly to the other equipment structures (e.g., cabinets and other enclosures or framework).

The "overhead" cable pathway structures are typically run "overhead," as racks commonly have a height equivalent or greater than the height of a technician. It is to be understood that "overhead" is not intended to be limiting to the height of technician, but rather means that the cable pathway structures are located a distance from the floor 66, typically overhead, but more commonly above the structure to which the equipment is mounted (e.g. the rack or cabinet). In the illustrated embodiment of FIGS. 1 and 2, the overhead cable pathway structure is a U-shaped channel or trough 16. In another embodiment, the overhead cable pathway structure can include a ladder-type structure. Other types of structures that carry cables overhead to and from racks or cabinets can be used in accordance with the principles disclosed.

In utilizing the space above equipment racks for the "run" of cables, it can be understood that cable pathway structure provides a generally horizontal run for the cables. That is, the cable pathway structures are constructed such that the cables run more horizontally, than vertically, when carried by the cable pathway structure.

In conventional arrangements, cables carried by the overhead cable pathway structures are pulled down from the overhead structure and terminated to a termination panel mounted on the equipment racks. Termination panels are panels to which overhead cables are terminated and generally include a number of adapters or connectors. Excess cable slack of the terminated cables is typically stored on spools that are attached to panels mounted on the racks or in the cabinets.

Referring still to FIG. 2, the overhead cable management system of the present disclosure improves upon the spatial utilization of racks and facilities. That is, the overhead cable management system increases service capacity of a facility by providing cable storage at a location other than the rack. Cable storage is instead provided in unoccupied space located above the racks. Valuable facility space can thereby be allocated for more racks, as opposed to being constrained by the requirement of cable storage.

In the illustrated system of FIG. 2, overhead termination panels (e.g. 70, 72, 74) are mounted to the overhead cable pathway structure 14. Further details of the overhead termination panels are described in U.S. application Ser. No. 11/655,757; which application is incorporated herein by reference.

Referring now to FIGS. 1 and 2, the cable storage device 12 (schematically represented in FIG. 2) of the present system 10 mounts to the overhead pathway structure 14, as opposed to being mounted to a rack (e.g., 54). The cable storage device 12 includes at least one cable storage spool 18 (FIG. 1). In the illustrated embodiment, the cable storage device 12 includes two cable storage spools 18. Excess cable slack 60 of the cables 58 carried by the overhead cable pathway structure 14 are routed to the spool 18 of the device for storage.

The cable storage device 12 further includes a mounting bracket 20. The cable storage spools 18 of the device 12 are releasably attached to the mounting bracket 20. That is, the spools 18 can be detached from the mounting bracket 20 so that excess cable slack (e.g., 60) can be wrapped about the spools. Further details of a detachable spool that can be used in the present system are described in U.S. Pat. No. 6,625,374; which patent is incorporated herein by reference.

Figure 3:
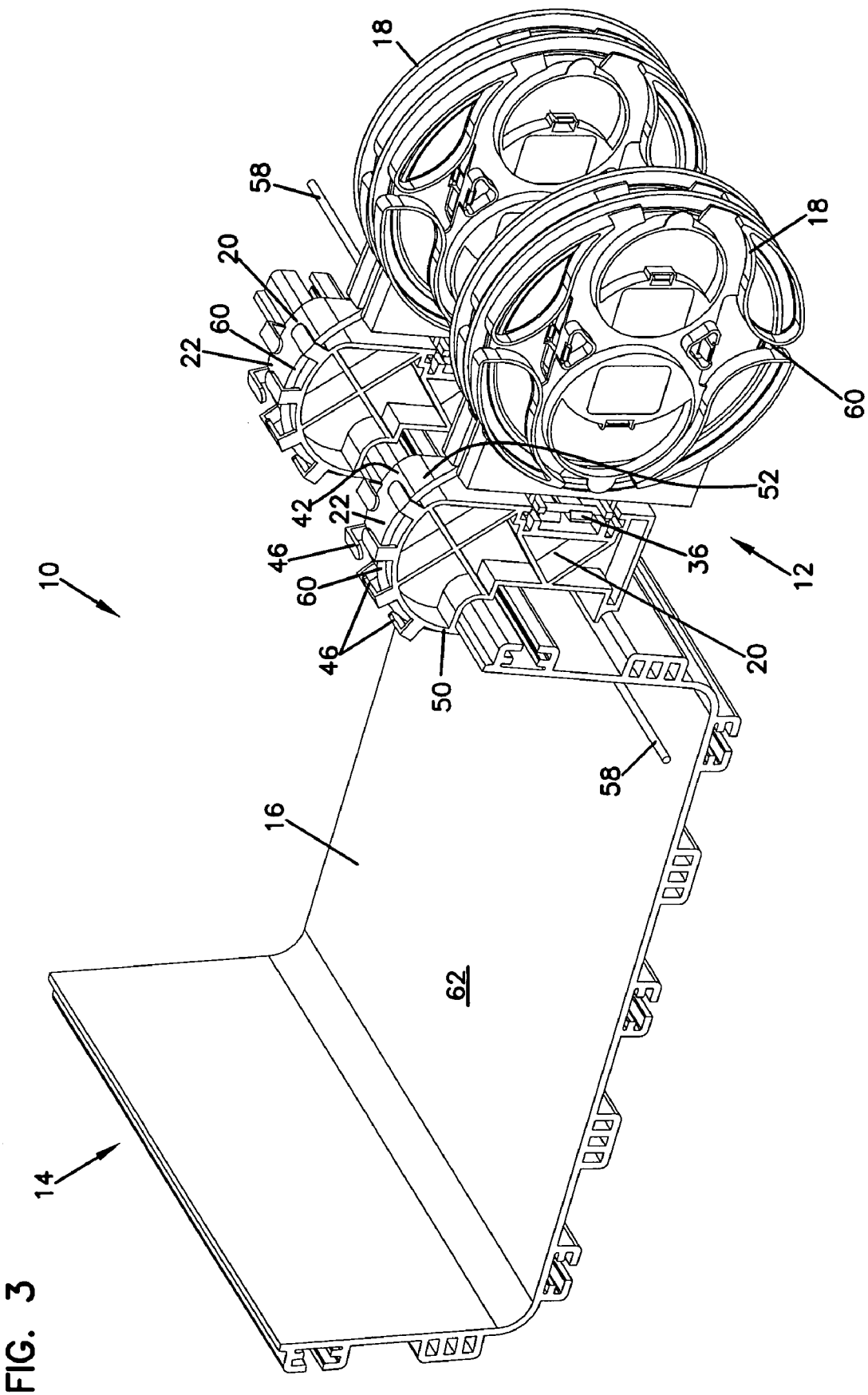
FIG. 3 is a front perspective view of two cable storage devices of FIG. 1, mounted to an overhead cable pathway structure.

Referring now to FIGS. 1 and 3, the cable storage spools 18 are releasably attached to the mounting bracket 20 by a pin attachment 36. The pin attachment 36 permits the spools to pivot about an axis. The pivoting arrangement allows a technician to separate the spools 18 (as shown in FIG. 1) to access an individual one of the spools, yet store the spools in a compact manner (as shown in FIG. 3) to minimize the space generally occupied by cable storage device 12.

Figure 4:
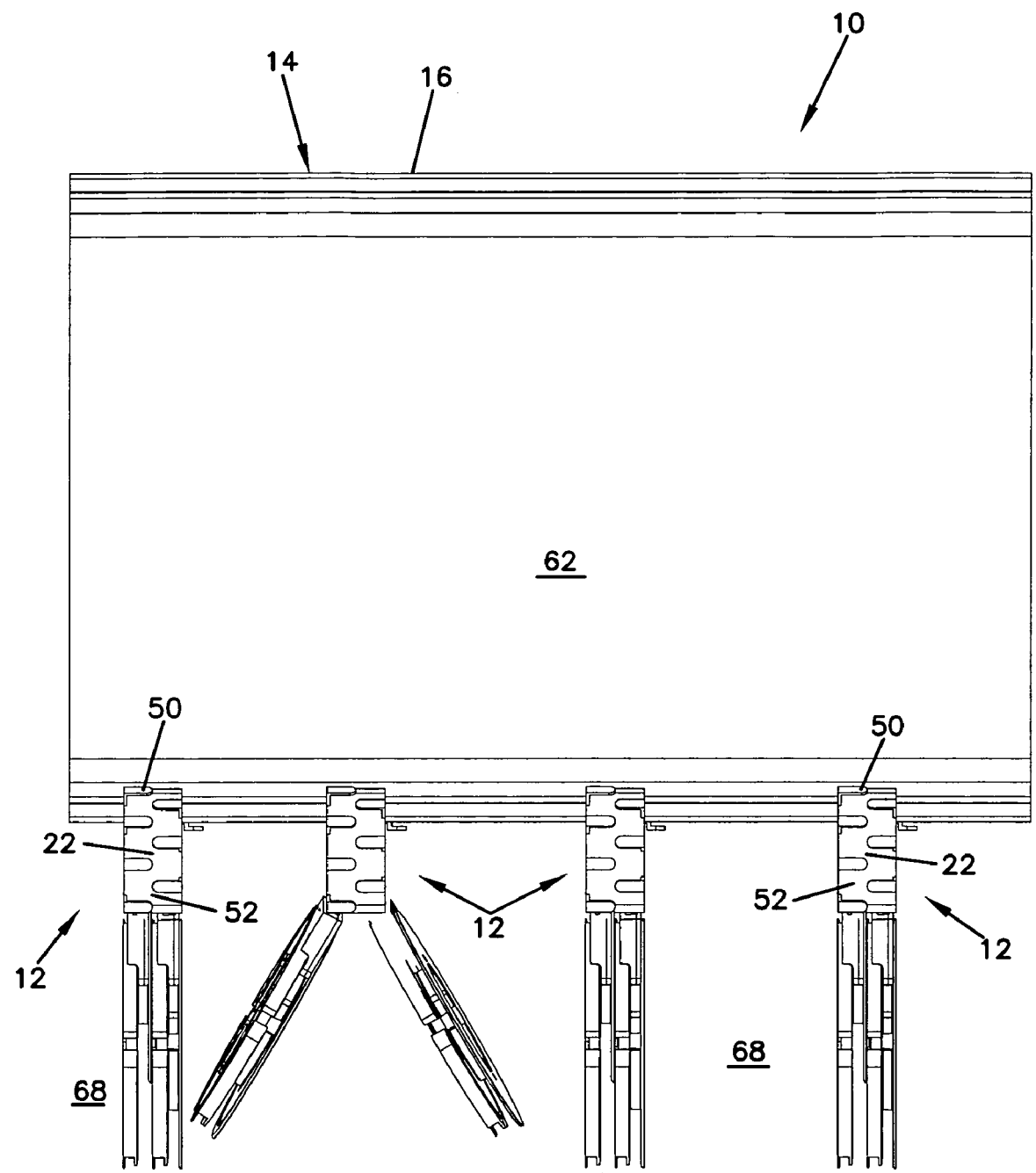
FIG. 4 is a top plan view of a plurality of cable storage devices of FIG. 1, mounted to an overhead cable pathway structure.

Referring back to FIG. 1, the mounting bracket 20 of the cable storage device 12 includes first and second mounting structures 24, 26 that detachably secure or mount the device 12 at a selected location along the overhead cable pathway structure 14. Also, the mounting bracket 20 is designed so that the cable storage device 12 can be selectively mounted at one of many locations along the length of the overhead cable pathway structure 14; and can later be moved if needed. FIG. 4 illustrates a number of cable storage devices 12 mounted at selected locations along the length of the overhead cable pathway structure 14.

Still referring to FIG. 1, the first mounting structure 24 of the mounting bracket 20 includes a U-shaped construction 28 that engages or clamps onto a top edge 30 of the trough 16. The second mounting structure 26 includes a lip or mounting ledge 32 that engages a shoulder 34 formed in the trough 16. The U-shaped construction 28 and the mounting ledge of the mounting bracket 20 permit the technician to mount the cable storage device 12 in any desired position along the trough 16 relative to the racks 54, as needed.

Referring now to FIG. 3, the mounting bracket 20 of the cable storage device 12 further includes a cable pathway exit 22. As shown in FIG. 4, the cable pathway exit 22 generally has an inner portion 50 and an outer portion 52. The inner portion 50 of the cable pathway exit 22 is located within a cable-carrying region 62 of the overhead cable pathway structure 14 when the device 12 is mounted to the structure 14. The outer portion 52 of the cable pathway exit 22 is located outside of the cable-carrying region 62 when the device is mounted to the structure 14.

The cable-carrying region 62 is the region in which the cables 58 (FIG. 1) lie or run when carried by the overhead cable pathway structure 14. The cable-carrying region 62 of the U-shape trough 16, for example, is generally the volume of space defined by the U-shaped trough. Likewise, the cable-carrying region of a ladder-type structure is generally the region defined above the footprint of the ladder structure. The cable storage spools 18 of the presently disclosed cable storage device 12 are located outside of the cable-carrying region 62 of the overhead cable pathway structure; i.e., in an adjacent lateral region 68 outside of the cable-carrying region 62.

Referring back to FIG. 3, the inner and outer portions 50, 52 of the cable pathway exit 22 are interconnected by a curved surface 42. The curved surface 42 guides the excess cable slack 60 exiting from the overhead cable pathway structure 14 toward the spools 18. Preferably, the curved surface 42 has a radius that prevents the cable slack from exceeding a minimum bend radius. The cable storage device 12 can further include fingers 46 to retain the cables that are exiting the overhead cable pathway structure 14. The fingers 46 aid to retain the excess cable slack 60 within the cable pathway exit 22, and on the curved surface 42 to prevent the cable slack from exceeding a minimum bend radius. In the illustrated embodiment, the fingers 46 are located at opposite edges of the curved surface 42 of the cable pathway exit 22.

The overhead pathway device 12 of the present disclosure minimizes the amount of rack space needed in a data center, central office, or other telecommunications facility. Alternatively, the device allows for expansion and/or upgrade of systems in facilities having spatial constraints, and can be added without having to add racks or cabinets. The devices also are designed to be easily incorporated into existing systems, i.e., mounted to exiting overhead troughs, for example, without incurring costs associated with replacing or upgrading existing overhead structures.

In addition, the present device does not interfere with cooling pathways of existing systems. For instance, in conventional methods, expanding the capacity of cabinets can require the installation of cable storage panels and devices. The added panels and devices can block air flow needed to cool the electrical components inside the cabinet. Because the overhead cable storage device 12 of the present system is mounted overhead, the device does not obstruct the air flow passages through the cabinet.

As can be understood, the disclosed panel arrangement can be adapted for use in many cabling applications. For example, the cable storage device can be used for overhead storage of excess fiber optic cabling, excess copper cabling, excess hybrid cabling, or excess cabling of both fiber optic and copper cables.

The above specification provides a complete description of the present invention. Since many embodiments of the invention can be made without departing from the spirit and scope of the invention, certain aspects of the invention reside in the claims hereinafter appended.

What is claimed is:

1. A overhead cable management system, comprising:
   a) an overhead cable pathway structure defining a cable-carrying region in which cables run in a first direction; and
   b) an arrangement of cable storage devices, each cable storage device being mounted to the overhead cable pathway structure, each cable storage device including:
      i) a mounting bracket that mounts the cable storage device to the overhead cable pathway structure, the mounting bracket:
         1) defining a cable pathway exit having a curved surface that guides excess cable out of the overhead pathway structure in a second direction transverse to the first direction, the cable pathway exit having an inner portion located within the cable-carrying region and an outer portion located outside the cable-carrying region of the overhead cable pathway structure;

2) defining only two spool-attachment locations; and 3) including a first plurality of discrete fingers located along a first edge of the cable pathway exit and a second plurality of discrete fingers located along a second edge of the cable pathway exit, the discrete fingers retaining the exiting excess cable within the cable pathway exit, the discrete fingers extending along a substantial majority of the length of the cable pathway exit such that at least a first finger of each plurality of discrete fingers is located on the inner portion of the cable pathway exit and at least a second finger of each plurality of discrete fingers is located on the outer portion of the cable pathway exit; and ii) two cable storage spools releasably attached to the mounting bracket at the two spool-attachment locations, the two cable storage spools being pivotally separable from one another; the cable storage spools being located outside the cable-carrying region of the overhead cable pathway structure;

iii) wherein during storage use, the cable storage spools are oriented such that excess cable stored on each cable storage spool is wrapped about the cable storage spool in the second direction transverse to the first direction;

c) wherein each cable storage device of the arrangement of cable storage devices is spaced from an adjacent cable storage device such that each spool of the arrangement is pivotally separated from adjacent spools without pivoting the adjacent spools.

2. The system of claim 1, wherein the mounting bracket detachably mounts the cable storage device at a location along the overhead cable pathway structure.

3. The system of claim 1, wherein the arrangement of cable storage devices can be selectively mounted at one of a number of locations along the overhead cable pathway structure.

4. The system of claim 1, wherein the overhead cable pathway structure includes a U-shaped cable trough.

5. A overhead cable storage device, comprising:

a) a plurality of cable storage spools, where each spool stores excess cable from an overhead cable pathway structure having a cable-carrying region in which cables run in a first direction; and b) a mounting bracket that mounts the cable storage spools to the overhead cable pathway structure, the mounting bracket including a cable pathway exit having a curved surface that extends over a top edge of the overhead cable pathway structure when mounted to the overhead cable pathway structure, the curved surface guiding excess cable from the overhead cable pathway structure toward the cable storage spools in a second direction transverse to the first direction when mounted to the overhead cable pathway structure;

c) a first plurality of discrete fingers located along a first edge of the cable pathway exit and a second plurality of discrete fingers located along a second edge of the cable pathway exit, the discrete fingers retaining the exiting excess cable within the cable pathway exit, the discrete fingers extending along a significant majority of the length of the cable pathway exit;

d) wherein each of the cable storage spools releasably attaches to the mounting bracket, and wherein during storage use, each cable storage spool is oriented such that excess cable stored on the cable storage spool wraps about the cable storage spool in the second direction transverse to the first direction; and e) the plurality of cable storage spools being pivotally separable from each other without pivoting adjacent spools.

6. The device of claim 5, wherein each cable storage spool is releasably attached to the mounting bracket by a pin attachment, the pin attachment allowing the cable storage spools to pivot relative to one another.

7. The device of claim 6, wherein the cable storage spools each pivot about a vertical pivot axis.

8. The device of claim 5, wherein the cable storage spool is vertically oriented when mounted to the overhead cable pathway structure, the vertical orientation being defined by a spool diameter, which in turn defines a vertical plane.

9. The device of claim 5, wherein the cable pathway exit has an inner portion and an outer portion, and wherein when the device is mounted to the overhead cable pathway structure, the inner portion is located within the cable-carrying region of the overhead cable pathway structure and the outer portion is located outside the cable-carrying region of the overhead cable pathway structure.

* * * * *